March 29, 1927.                                           1,622,375
                       J. DAHMEN
                 HEAD SPINDLE STOCK GUIDE
                  Filed June 3, 1925         2 Sheets-Sheet 1

Inventor
Josef Dahmen
by
attorney

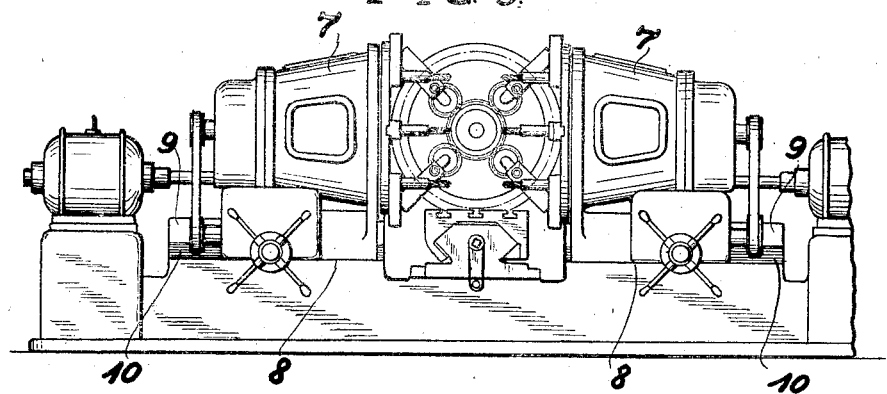
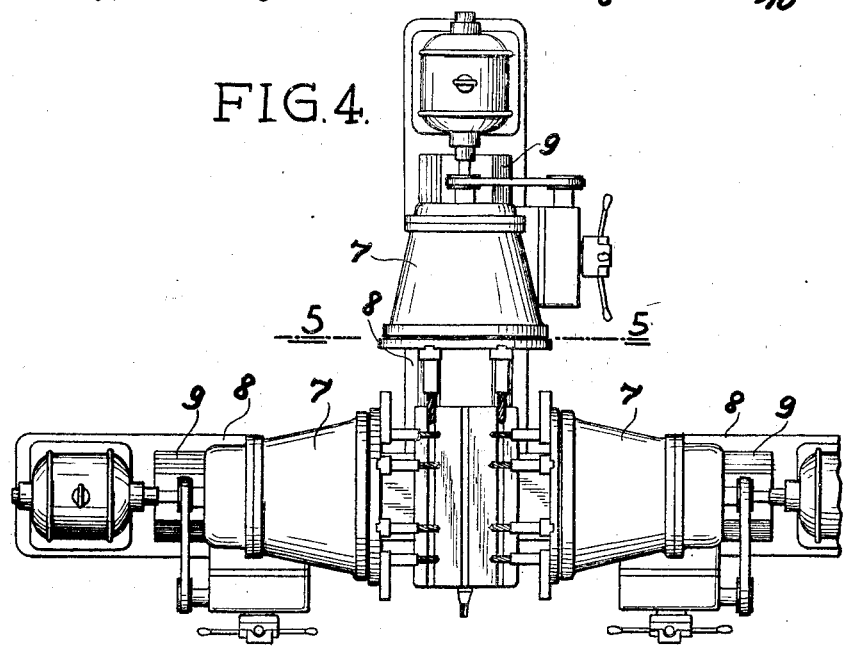
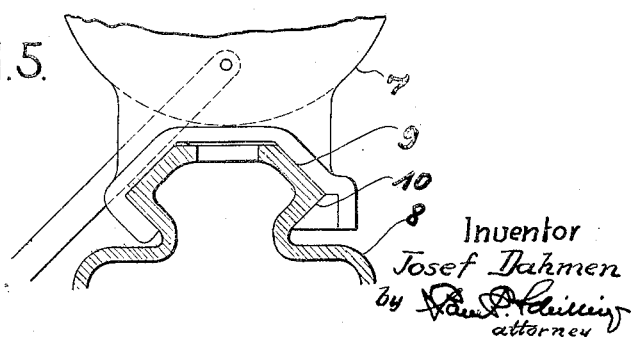

Patented Mar. 29, 1927.

1,622,375

UNITED STATES PATENT OFFICE.

JOSEF DAHMEN, OF DUSSELDORF, GERMANY, ASSIGNOR TO DUSSELDORFER WERKZEUGMASCHINEN-FABRIK UND EISENGIESSEREI HABERSANG & ZINZEN, G. M. B. H., OF DUSSELDORF-OBERBILK, GERMANY.

HEAD-SPINDLE-STOCK GUIDE.

Application filed June 3, 1925, Serial No. 34,621, and in Germany June 12, 1924.

This invention has reference to improvements in head-spindle-stocks and it is particularly intended to provide means of improving the guiding and the operation of head spindle stocks as applied to boring and drilling machines and the like, and to generally improve the construction of such guiding means. In accordance with the previous art the general practice has been to guide the head spindle-stock for boring machines upon a straight, flat base or foundation or in a straight path along the flat supporting prism or pillar. This manner of guiding the spindle stock is objectionable, particularly for multi-spindle boring machines, because the holders for the boring or drilling spindles can only be adjusted with difficulty or not at all in the case of certain configurations of holes. Furthermore than that, the guiding surface is not suitable to resist the heavy strains occurring as a result of the one-sided action of the load upon the head spindle stock in view of the lack of uniformity of the drilling pressure; or a very wide shape of the straight guiding surfaces becomes necessary. Such enlargement of guiding surface is, however, objectionable on account of the accessibility of the drilling table being greatly interferred with thereby.

It is one of the main objects of the present invention to overcome the difficulties referred to by providing novel guiding means for the spindle stock of boring and drilling machines of all kinds which is so constructed and arranged as to provide additional space both for the head spindle stock as well as for the drilling table, while at the same time presenting considerably more bearing surface than the straight guiding means heretofore in use. In accordance with the preferred construction of this invention the head spindle stock, instead of being guided on one plane surface, is guided along a plurality of surfaces angularly arranged with relation to each other, and of which the lateral surfaces are backwardly inclined.

Figure 1:
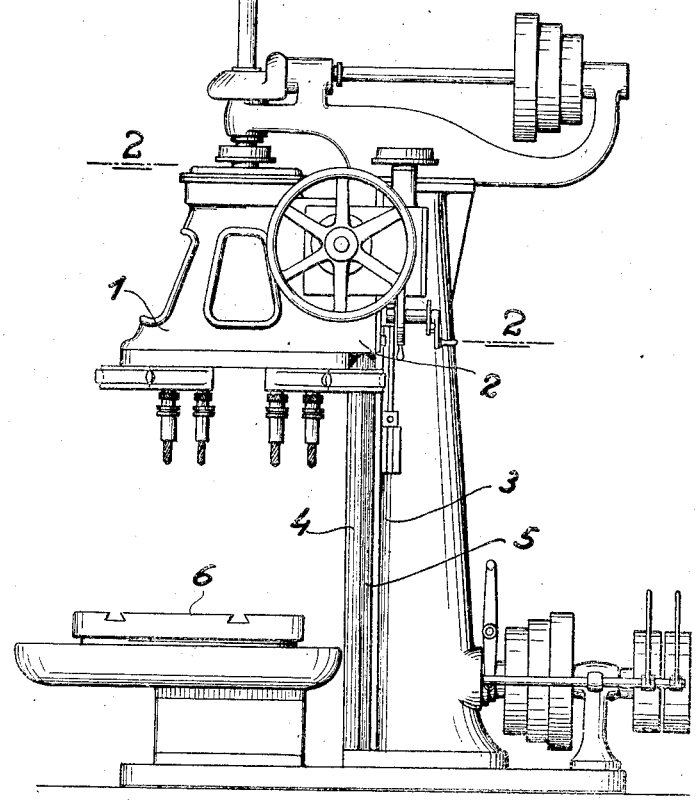
Figure 2:
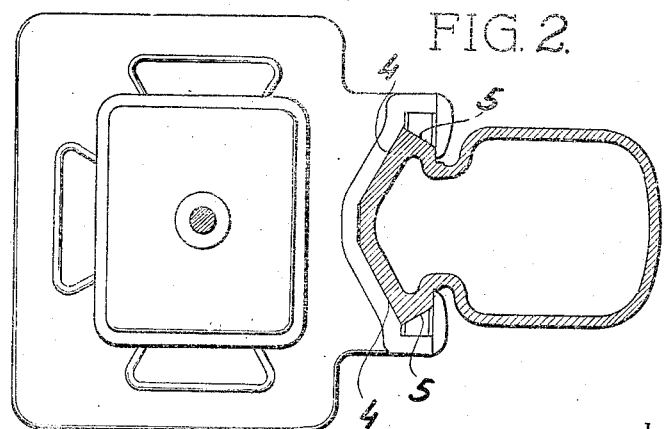

The invention will be more fully described with reference to the accompanying drawings showing by way of example various embodiments of the principle of my invention. Figure 1 is a side view and Figure 2 a transverse section of a vertical drilling machine, and Figure 3 is a side view, Figure 4 is a plan view and Figure 5 is a sectional view on the line C—D of a horizontal drilling or boring machine.

The head spindle stock 1 of the boring or drilling machine with its carriage 2 is adapted to slide along the guide 3 which is provided with rearwardly inclined sliding surfaces 4, 5 which, besides affording a strong support to the spindle stock, substantially increases the accessibility to the drilling table 6, so that the drilling or boring spindles may be readily adjusted for all occurring configurations of holes.

In the horizontal boring machine the head spindle stocks 7 are supported upon guide bases 8, possessing a plurality of downwardly obliquely disposed sliding surfaces 9 and 10. This configuration of the guiding surfaces provides the additional advantage of a very satisfactory discharge of the chips and of the rinsing water.

The invention has been described and explained in its broad aspects only, and it should be understood that it is susceptible of many other embodiments and modifications without being restricted to the particular configuration and arrangement of parts, hereinbefore set forth without deviating from the spirit of this invention, except as particularly specified in the appended claims.

I claim:—

1. In a head-stock guide for drilling and boring machines, a frame, a stationary hollow integral guide structure on the frame comprising a body portion having at one side thereof a guide rib of angular form in cross-section and of less width than said body portion, said rib presenting a transversely flat front face of restricted width, a pair of opposite side faces extending outwardly and rearwardly at oblique angles to said front face, and two rear faces extending inwardly and rearwardly at oblique angles to said side faces, said rear faces having wall extensions forming a neck connection between the body portion and rib, and a head spindle-stock provided with a guide sleeve slidably embracing said front, side and rear faces of the rib and having an angular internal form conforming thereto.

2. In a head-stock guide for drilling and boring machines, a frame, a stationary hollow integral guide structure on the frame comprising a body portion having at one side thereof a hollow guide rib of angular form in cross-section and of less width than said body portion, said rib presenting a transversely flat front face of restricted width, a pair of opposite side faces extending outwardly and rearwardly at oblique angles to said front face, and two rear faces extending inwardly and rearwardly at oblique angles to said side faces, said rear faces having wall extensions joined to divided portions of the said side of the body portion and forming a neck connection between the body portion and rib, and a head spindle-stock provided with a guide sleeve slidably embracing said front, side and rear faces of the rib and having an angular internal form conforming thereto.

In testimony whereof I affix my signature.

JOSEF DAHMEN.